United States Patent
Kettner et al.

(10) Patent No.: US 9,476,132 B2
(45) Date of Patent: Oct. 25, 2016

(54) ELECTROLYSIS CELL WITH MULTIPLE MEMBRANES FOR CUCL/HCl ELECTROLYSIS IN HYDROGEN PRODUCTION

(71) Applicant: ATOMIC ENERGY OF CANADA LIMITED, Chalk River (CA)

(72) Inventors: Andrew Kettner, Pembroke (CA); Lorne Stolberg, Pembroke (CA); Hongqiang Li, Deep River (CA); Alexi Shkarupin, Deep River (CA); Sellathurai Suppiah, Deep River (CA)

(73) Assignee: ATOMIC ENERGY OF CANADA LIMITED, Chalk River, Ontario (CA)

( * ) Notice: Subject to any disclaimer, the term of this patent is extended or adjusted under 35 U.S.C. 154(b) by 0 days.

(21) Appl. No.: 14/388,424

(22) PCT Filed: Mar. 28, 2013

(86) PCT No.: PCT/CA2013/000294
§ 371 (c)(1),
(2) Date: Sep. 26, 2014

(87) PCT Pub. No.: WO2013/142971
PCT Pub. Date: Oct. 3, 2013

(65) Prior Publication Data
US 2015/0047988 A1 Feb. 19, 2015

Related U.S. Application Data

(60) Provisional application No. 61/618,167, filed on Mar. 30, 2012.

(51) Int. Cl.
| | |
|---|---|
| C25B 1/00 | (2006.01) |
| C25B 9/08 | (2006.01) |
| C25B 1/02 | (2006.01) |
| C25B 1/26 | (2006.01) |
| C25B 11/04 | (2006.01) |

(52) U.S. Cl.
CPC . *C25B 9/08* (2013.01); *C25B 1/02* (2013.01); *C25B 1/26* (2013.01); *C25B 11/0473* (2013.01); *C25B 11/0478* (2013.01)

(58) Field of Classification Search
CPC ............. C25B 9/08; C25B 1/02; C25B 1/26; C25B 11/0473; C25B 11/0478
USPC ............................................................. 9/8
See application file for complete search history.

(56) References Cited

U.S. PATENT DOCUMENTS

| | | | |
|---|---|---|---|
| 4,376,019 A | 3/1983 | Gamlen et al. | |
| 4,636,288 A * | 1/1987 | Vaughan ................ | B01D 61/44 204/520 |
| 2010/0044241 A1 | 2/2010 | Pendleton et al. | |
| 2010/0051469 A1 | 3/2010 | Stolberg | |

* cited by examiner

*Primary Examiner* — Arun S Phasge
(74) *Attorney, Agent, or Firm* — Nixon Peabody LLP

(57) ABSTRACT

An electrochemical cell for producing hydrogen gas and cupric chloride. The cell comprises: an anode compartment comprising an anode for disposition in an anolyte, wherein the anolyte is cuprous chloride in hydrochloric acid; a cathode compartment comprising a cathode, wherein the cathode comprises an electrocatalyst; a plurality of ion exchange membranes disposed between the anode compartment and the cathode compartment; and at least one center compartment defined by a pair of said ion exchange membranes and comprising at least one element for removal or sequestering of copper ions that cross at least one of said membranes from the anode compartment. Also described is a method for CuCl/HCl electrolysis in the production of hydrogen using the electrochemical cell.

31 Claims, 4 Drawing Sheets

ELECTROLYSIS CELL WITH MULTIPLE MEMBRANES FOR CUCL/HCL ELECTROLYSIS IN HYDROGEN PRODUCTION

CROSS-REFERENCE TO RELATED APPLICATIONS

This Application is a 35 U.S.C. §371 National Phase Entry Application of International Application No. PCT/CA2013/000294 filed Mar. 28, 2013, which designates the U.S., and which claims benefit under 35 U.S.C. §119(e) of U.S. Provisional Application No. 61/618,167, filed on Mar. 30, 2012, the contents of each of which are herein incorporated by reference in their entirety.

FIELD OF INVENTION

The present invention relates to the production of hydrogen, especially those processes which use the Cu—Cl cycle. In particular, the invention relates to an improved electrolysis cell and method for CuCl/HCl electrolysis in the production of hydrogen.

BACKGROUND OF THE INVENTION

The Copper-Chlorine (Cu—Cl) cycle is a thermochemical cycle used for the production of hydrogen, and can be linked with nuclear plants, or other heat sources such as solar and industrial waste heat, to potentially achieve higher efficiencies, lower environmental impact, and lower costs than other conventional hydrogen production technologies.

The Cu—Cl cycle is of interest to Atomic Energy of Canada Limited (AECL) because all of the chemical and electrochemical reactions can be carried out at temperatures that do not exceed about 530° C. This means that the heat requirement of this process can be supplied by the Generation IV Supercritical-Water-Cooled Reactor (SCWR) that is being developed by AECL, which can produce heat at temperatures up to 625° C. The Sodium cooled Fast Reactor (SFR) is another nuclear reactor capable of providing heat at around 530° C. Both the SCWR and SFR, therefore, are ideally suited for electricity production and co-generation of hydrogen.

The Cu—Cl cycle has been developed with several variations, including a four-step process with the following reaction steps:

| Step | Reaction |
| --- | --- |
| 1 | $2CuCl(aq) + 2HCl(aq) \rightarrow H_2(g) + 2CuCl_2(aq)$ |
| 2 | $CuCl_2(aq) \rightarrow CuCl_2(s)$ (drying step) |
| 3 | $2CuCl_2(s) + H_2O(g) \rightarrow Cu_2OCl_2(s) + 2HCl(g)$ |
| 4 | $Cu_2OCl_2(s) \rightarrow 2CuCl(l) + \frac{1}{2}O_2(g)$ |

In the four-step Cu—Cl cycle, a chemical species that is consumed in one reaction, such as HCl in Step 1, is produced in a different reaction step, which is Step 3 for HCl. Thus, all of the chemicals are recycled except for water, hydrogen and oxygen, which is consistent with the net reaction being the splitting of water as follows:

$$H_2O(g) \rightarrow H_2(g) + 1/2 O_2(g)$$

In the electrochemical reaction step of the Cu—Cl cycle, the anolyte is a solution of CuCl dissolved in HCl. The catholyte is typically an HCl solution, but in certain variations can be water and in others the catholyte is not required. During the electrolysis step, cuprous ions ($Cu^+$) are oxidized to cupric ions ($Cu^{2+}$) at the anode while protons are reduced at the cathode to produce hydrogen.

U.S. 2010/0051469 (Stolberg) describes a single membrane electrolysis cell for CuCl/HCl electrolysis. Stolberg demonstrated that a cell configuration of the type shown in FIG. 1 can be used to produce hydrogen by electrolysing a solution of CuCl/HCl at various concentrations of these species.

SUMMARY OF THE INVENTION

It is an object of the invention to provide an improved electrolysis cell and method for CuCl/HCl electrolysis in the production of hydrogen.

According to an aspect of the present invention there is provided an electrochemical cell for producing hydrogen gas and cupric chloride, comprising: an anode compartment comprising an anode (and optionally an electrocatalyst) for disposition in an anolyte, wherein the anolyte is cuprous chloride in hydrochloric acid; a cathode compartment comprising a cathode, wherein the cathode comprises an electrocatalyst; a plurality of ion exchange membranes disposed between the anode compartment and the cathode compartment; and at least one center compartment defined by a pair of said ion exchange membranes and comprising at least one element for removal or sequestering of copper ions that cross at least one of said membranes from the anode compartment.

In embodiments of the electrochemical cell, the plurality of ion exchange membranes may comprise anion exchange membranes, cation exchange membranes, or a combination thereof.

In further optional embodiments, the at least one center compartment comprises gas diffusion layers (GDLs) positioned adjacent the ion exchange membranes and defining sidewalls of the at least one center compartment.

The at least one center compartment may also comprise an inlet and an outlet to allow flow of an electrolyte therethrough. For instance, the inlet and the outlet may be connected to an electrolyte source to allow continuous flushing of the at least one center compartment with an electrolyte effective to remove copper ions. In certain non-limiting examples, the electrolyte may be water or hydrochloric acid. In the case of hydrochloric acid, the concentration may be in the range of about 1 M to about 12 M, for example within the range of about 4 M to about 11 M, such as about 6 M or about 11 M.

The selection flushing electrolyte would be effected by catholyte and anolyte compositions. In further embodiments, the electrolyte may comprise at least one material that can absorb, adsorb or react with the copper ions in the at least one center compartment.

The at least one center compartment may also be filled with a material to remove the copper ions in the at least one center compartment, by adsorption, chelation or other chemical reaction. In certain embodiments, the at least one center compartment may be filled with Reticulated Vitrious Carbon (RVC).

In yet further embodiments, the copper species can be removed from the center compartment in-situ by a deposition, absorption and/or chemical reaction, or ex-situ by a chemical separation process.

One or more of the plurality of ion exchange membranes may, as an example, be a cation exchange membrane, such as but not limited to a proton exchange membrane including those made from a resin of hydrated copolymers of polytetrafluoroethylene and poly-sulphonyl fluoride vinyl ether-containing pendent sulphonic acid groups. For instance, the proton exchange membrane may be a NAFION® N112, NAFION® N115, NAFION® N117, NAFION® N1110, NAFION® NRE-211, NAFION® NRE-212, NAFION® N324, NAFION® XL or NAFION® NE-1135 membrane. In other embodiments, the ion exchange membrane may be an anion exchange membrane, including membranes such as ACM, AMV, ASV, AXE or other anion exchange membranes used for desalination, electrodeionization, or any other such processes.

In certain embodiments of the anolyte, the hydrochloric acid concentration may be in the range of about 1 M to about 12 M, for instance within the range of about 4 M to about 11 M, or about 6 M, or alternatively about 11 M.

In other embodiments, the cathode may be for disposition, or disposed in a catholyte. For example, the catholyte may be water or hydrochloric acid. In the case of the latter, the hydrochloric acid concentration in the catholyte may be in the range of about 1 M to about 12 M, for example within the range of about 4 M to about 10 M, such as about 6 M or about 10 M.

In yet further embodiments, the electrocatalyst may be a metal such as platinum, ruthenium, palladium, iridium, osmium, and rhodium, for example platinum. Alternatively, the electrocatalyst may be a bimetallic alloy of platinum and a second metal such as ruthenium, tin, rhodium, molybdenum, nickel, cobalt, iron, or titanium, more particularly a bimetallic alloy of platinum and ruthenium. As another alternative, the electrocatalyst may comprise an alloy of platinum, ruthenium, and a third component such as tungsten, tungsten oxide ($WO_2$), tin, osmium, palladium, cobalt, iridium, manganese, chromium, gold, silver, rhodium, or tungsten carbide ($W_2C$). In addition, the electrocatalyst may comprise a thin film coating, or be dispersed on a high surface area carbon powder.

Also provided herein is a method for producing hydrogen gas, comprising:

(i) providing the electrochemical cell as described above; and (ii) applying an electrical potential or current between the anode and cathode to produce hydrogen gas.

The above-described method may additionally comprise the steps of collecting and storing the hydrogen gas produced in step (ii).

BRIEF DESCRIPTION OF THE DRAWINGS

These and other features of the invention will become more apparent from the following description in which reference is made to the appended drawings, wherein.

DETAILED DESCRIPTION

The present inventors have analyzed the electrolysis efficiency of electrolysis cells such as that described by Stolberg (U.S. 2010/0051469) in the Cu—Cl cycle. In carrying out these studies, it was found that copper ions cross the ion-exchange membrane that separates the anode and cathode compartments in the cell, and compromise electrolysis efficiency over short or long periods.

The $Cu^{2+}$ species that form when $Cu^+$ is oxidized can be neutral ($CuCl_2$) or cationic ($CuCl^+$), depending on the HCl concentration used. Thus, during CuCl/HCl electrolysis, copper species can cross the membrane by diffusion ($CuCl_2$) or by an ion-exchange ($CuCl^+$) transport process in addition to diffusion.

The transfer of copper ions from the anode to the cathode during CuCl/HCl electrolysis cannot be prevented when a single layer of membrane is used. In a configuration like the one shown in FIG. 1, increasing the catholyte flow rate may help to prevent copper from reaching the cathode. However, maintaining electrolysis efficiency and high performance of the cell over long periods is important for economical production of hydrogen from the Cu—Cl process. Accordingly, an improved cell design was needed.

In an effort to reduce copper species crossover, including neutral and charged species, and hence the concentration of copper in the cathode compartment, an electrolysis cell comprising more than one layer of ion-exchange membrane separating the anode and cathode compartments was designed and tested using the Stolberg electrolysis cell as a comparison.

Figure 1:
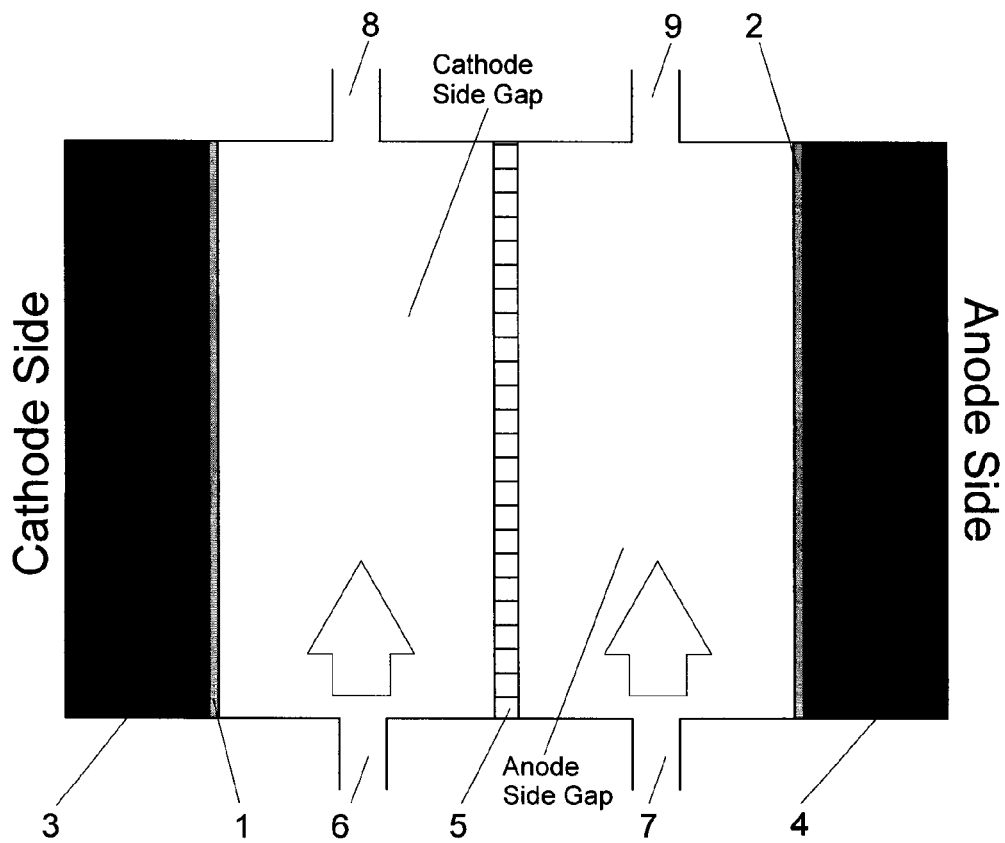
FIG. 1 illustrates the single-cell wide gap configuration of an electrolysis cell according to U.S. 2010/0051469 (Stolberg)
Figure 2:
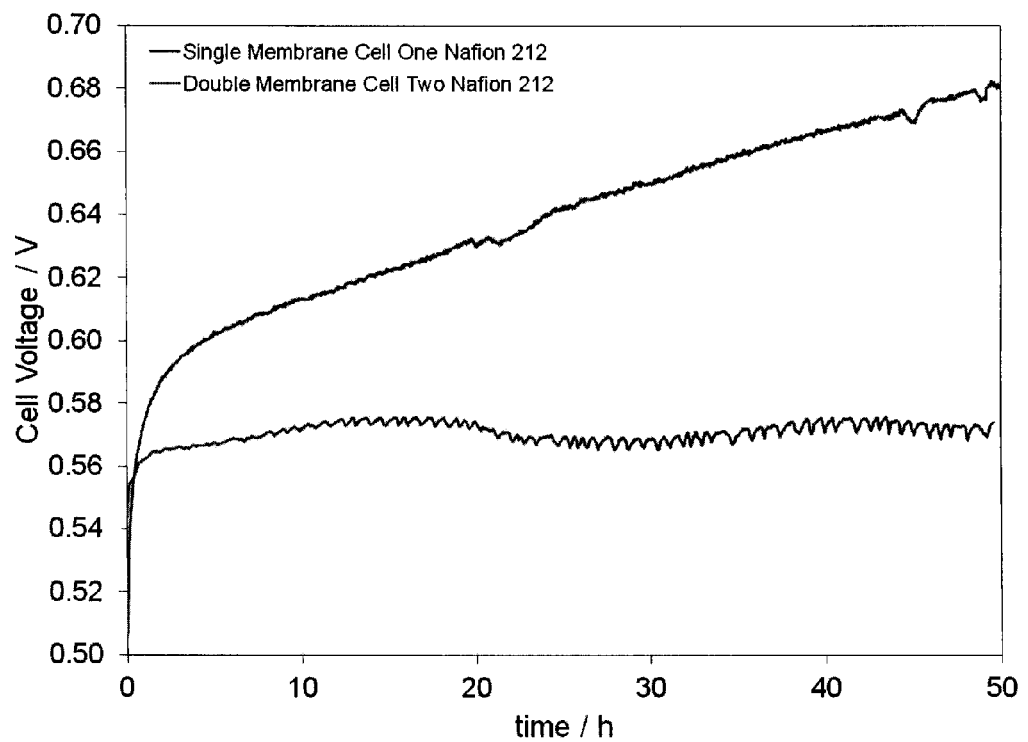
FIG. 2 illustrates the results of testing CuCl/HCl electrolysis cell performance in single and double membrane embodiments, in which voltage is measured as a function of time at a constant current.

One example of the electrolysis cell of Stolberg is shown in FIG. 1, and includes a cathode side catalyst (1), an anode side catalyst (2), cathode and anode side graphite blocks (3,4), a membrane (5), cathode and anode side solution inlet ports (6,7), and cathode and anode side solution outlet ports (8,9). In FIG. 2, the curve shown as "Single Membrane Cell One Nafion 212" demonstrates the performance characteristic of a cell designed according to Stolberg, using one proton exchange membrane (PEM).

Figure 3:
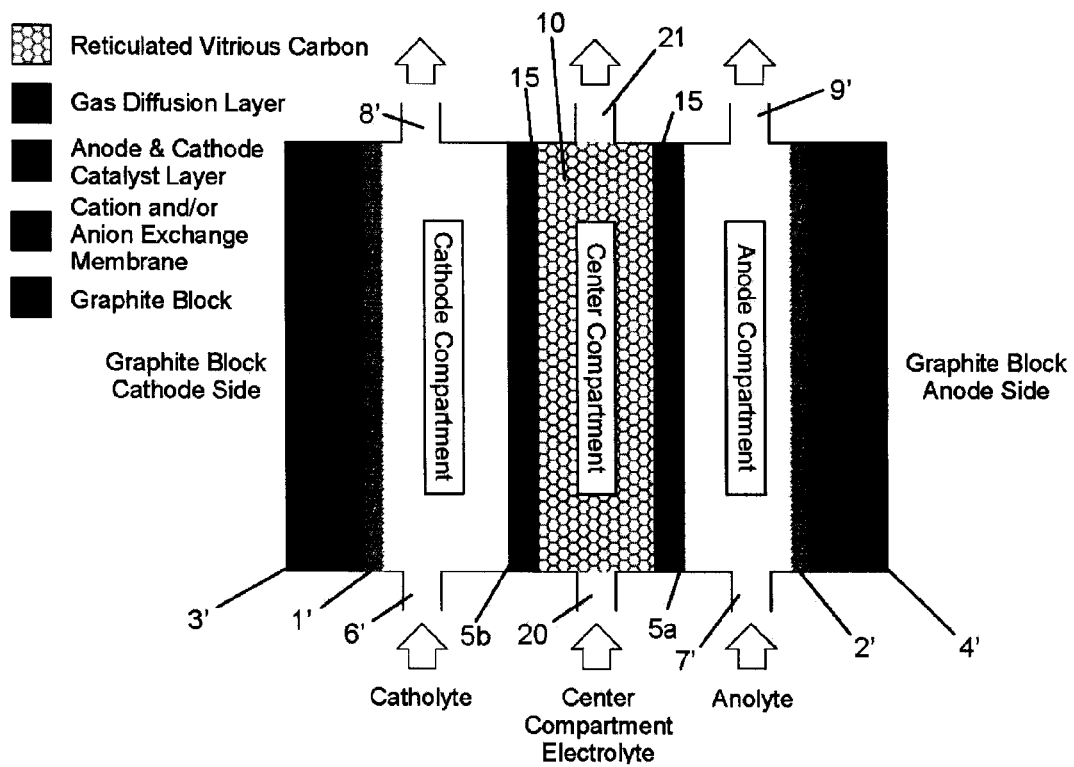
FIG. 3 illustrates a double membrane electrolysis cell according to an example of an embodiment of the present invention, in wide gap configuration.

Referring to FIG. 3, which is one example of an electrolysis cell according to the present invention, two ion-exchange membranes are used to form an isolated compartment in the middle of the two membranes. The cell comprises a cathode side catalyst layer (1'), an anode side catalyst layer (2'), cathode and anode side graphite blocks (3',4'), cation and/or anion-exchange membranes (5a and 5b), cathode and anode side solution inlet ports (6',7'), cathode and anode side solution outlet ports (8',9'), and a center compartment (10) formed between the first (5a) and the second (5b) ion exchange membrane layers. In the embodiment shown, the center compartment (10) comprises gas diffusion layers (15) positioned adjacent the membrane layers (5a) and (5b), as well as inlet (20) and outlet (21) ports. The center compartment (10) as shown contains a porous layer of RVC. Several variations of the embodiment shown in FIG. 3 are envisioned, including an embodiment in which there is a zero gap between the catalyst and the membranes. In this example RVC or some other suitable electronic conductor is placed between the graphite block and the gas diffusion layer. Another example of a zero gap configuration is achieved using graphite blocks or any other suitable material with flow fields. In this case, flow fields are used to direct the flow of the electrolytes through their respective compartments.

Copper ions from the anode compartment that cross the first membrane (5a) can be removed from the cell by continuously flushing the center compartment (10) with an electrolyte containing a minimum copper ion concentration. Alternatively, a suitable material may be inserted into the center compartment (10) between the two membranes to remove the copper species by adsorption or by other chemical reaction processes (e.g. chelation). The electrolyte used for flushing the centre compartment may also contain, as suspension or dissolved, materials that can absorb/adsorb or react with the copper species entering the middle compartment from the anode compartment.

Figure 4:
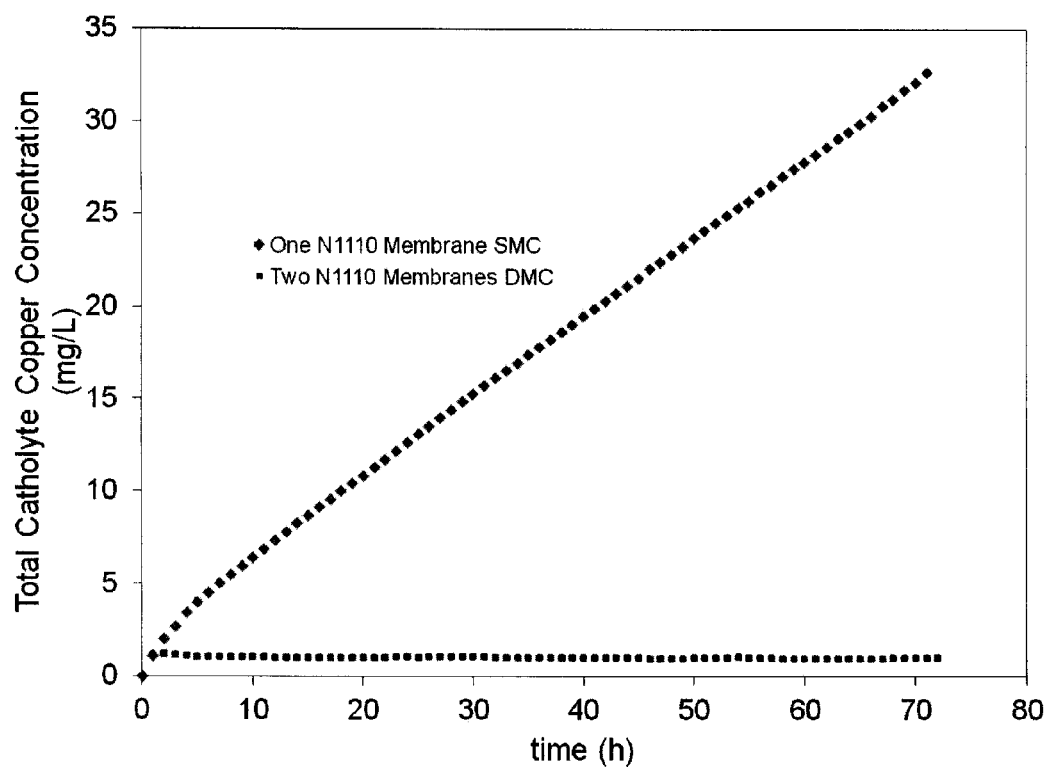
FIG. 4 illustrates the results of comparing between total catholyte copper species data for a single membrane cell (SMC) and a double membrane cell (DMC) using an N1110 ion exchange membrane; T=45° C.

Referring again to FIG. 2, the curve identified as "Double Membrane Cell Two Nafion 212" illustrates that the negative effects of the copper species is minimized and the cell performance is maintained at the desired level, especially as compared to the single membrane version of the electrolysis cell. In addition, the copper transfer from anode to cathode is greatly reduced, as can be seen in FIG. 4 which provides one example of an experiment carried out for more than 70 hours with very little copper observed in the catholyte when using two N1110 membranes in an electrolysis cell according to the present invention. In another test that ran 96 h, copper species were not found to be present in the catholyte (data not shown).

In further embodiments of the invention, the electrolysis cell may contain multiple central compartments between the two electrodes to accomplish the effect described above. Also, unlike Stolberg which describes the use of cation-exchange membranes in the cell, anion-exchange membranes may be used in the current invention. In other configurations, both anion- and cation-exchange membranes may be used, in any combination, in the same multiple-membrane cell in a strategic way.

The present invention reduces the net amount of copper transferred from the anode to the cathode compartment by using multiple membranes in a CuCl/HCl electrolysis cell. The compartment formed between two membranes provides a means to removing copper species in-situ (e.g. by adsorption or chemical reaction) or ex-situ (e.g. by flushing the compartment with clean electrolyte solution), thus reducing the amount of copper species reaching the cathode and improving the long-term performance of the CuCl/HCl electrolysis cell.

All publications, patent applications and patents mentioned in this specification are herein incorporated by reference.

While the invention has been described in connection with specific embodiments, it will be understood that it is capable of further modifications. Therefore, this application is intended to cover any variations, uses, or adaptations of the invention that follow, in general, the principles of the invention, including departures from the present disclosure that come within known or customary practice within the art.

What is claimed is:

1. An electrochemical cell for producing hydrogen gas and cupric chloride, comprising:
   an anode compartment comprising an anode for disposition in an anolyte, wherein the anolyte is cuprous chloride in hydrochloric acid;
   a cathode compartment comprising a cathode, wherein the cathode comprises an electrocatalyst;
   a plurality of ion exchange membranes disposed between the anode compartment and the cathode compartment; and
   at least one center compartment defined by a pair of said ion exchange membranes and comprising at least one element for removal or sequestering of copper ions that cross at least one of said membranes from the anode compartment, wherein the center compartment contains a porous layer of reticulated vitreous carbon or other porous material.

2. The electrochemical cell of claim 1, wherein the plurality of ion exchange membranes comprise anion exchange membranes, cation exchange membranes, or a combination thereof.

3. The electrochemical cell of claim 1, wherein the at least one center compartment comprises gas diffusion layers positioned adjacent the ion exchange membranes of the at least one center compartment.

4. The electrochemical cell of claim 1, wherein the at least one center compartment comprises an inlet and an outlet to allow flow of an electrolyte therethrough.

5. The electrochemical cell of claim 4, wherein the inlet and the outlet are connected to an electrolyte source to allow continuous flushing of the at least one center compartment with an electrolyte effective to remove copper ions.

6. The electrochemical cell of claim 4, the electrolyte further comprises at least one material that can absorb, adsorb or react with the copper ions in the at least one center compartment.

7. The electrochemical cell of claim 1, wherein the at least one center compartment is filled with a material to remove the copper ions in the at least one center compartment by adsorption, chelation or other chemical reaction.

8. The electrochemical cell of claim 1, wherein the at least one center compartment is filled with reticulated vitreous carbon.

9. The electrochemical cell of claim 1, wherein copper species are removed from the center compartment in-situ by a deposition, absorption and/or chemical reaction, or ex-situ by a chemical separation process.

10. The electrochemical cell of claim 1, wherein one or more of the plurality of ion exchange membranes is a proton exchange membrane made from a resin of hydrated copolymers of polytetrafluoroethylene and poly-sulphonyl fluoride vinyl ether-containing pendent sulphonic acid groups.

11. The electrochemical cell of claim 1, wherein one or more of the plurality of ion exchange membranes is an ion exchange membrane used for desalination or electrodeionization.

12. The electrochemical cell of claim 1, wherein the hydrochloric acid concentration is in the range of about 1 M to about 12 M.

13. The electrochemical cell of claim 12, wherein the hydrochloric acid concentration is within the range of about 4 M to about 11 M.

14. The electrochemical cell of claim 12, wherein the hydrochloric acid concentration is about 6 M.

15. The electrochemical cell of claim 12, wherein the hydrochloric acid concentration is about 11 M.

16. The electrochemical cell of claim 1, wherein the cathode is disposed in a catholyte.

17. The electrochemical cell of claim 16, wherein the catholyte is water.

18. The electrochemical cell of claim 16, wherein the catholyte is hydrochloric acid.

19. The electrochemical cell of claim 18, wherein the hydrochloric acid concentration in the catholyte is in the range of about 1 M to about 12 M.

20. The electrochemical cell of claim 18, wherein the hydrochloric acid concentration in the catholyte is within the range of about 4 M to about 10 M.

21. The electrochemical cell of claim 18, wherein the hydrochloric acid concentration in the catholyte is about 6 M.

22. The electrochemical cell of claim 18, wherein the hydrochloric acid concentration in the catholyte is about 10 M.

23. The electrochemical cell of claim 1, wherein the electrocatalyst is a metal selected from the group consisting of platinum, ruthenium, palladium, iridium, osmium, and rhodium.

24. The electrochemical cell of claim 23, wherein the electrocatalyst is platinum.

25. The electrochemical cell of claim 1, wherein the electrocatalyst is a bimetallic alloy of platinum and a metal selected from the group consisting of ruthenium, tin, rhodium, molybdenum, nickel, cobalt, iron, and titanium.

26. The electrochemical cell of claim 25, wherein the electrocatalyst comprises a bimetallic alloy of platinum and ruthenium.

27. The electrochemical cell of claim 1, wherein the electrocatalyst comprises an alloy of platinum, ruthenium, and a third component selected from the group comprising tungsten, tungsten oxide ($WO_2$), tin, osmium, palladium, cobalt, iridium, manganese, chromium, gold, silver, rhodium, and tungsten carbide ($W_2C$).

28. The electrochemical cell of claim 1, wherein the electrocatalyst comprises a thin film coating.

29. The electrochemical cell of claim 1, wherein the electrocatalyst is dispersed on a high surface area carbon powder.

30. A method for producing hydrogen gas comprising the following steps:
    (i) providing the electrochemical cell of claim 1; and
    (ii) applying an electrical potential between the anode and cathode to produce hydrogen gas.

31. The method of claim 30, additionally comprising the steps of collecting and storing the hydrogen gas produced in step (ii).

* * * * *

UNITED STATES PATENT AND TRADEMARK OFFICE
CERTIFICATE OF CORRECTION

| | | |
|---|---|---|
| PATENT NO. | : 9,476,132 B2 | Page 1 of 1 |
| APPLICATION NO. | : 14/388424 | |
| DATED | : October 25, 2016 | |
| INVENTOR(S) | : Andrew Kettner et al. | |

It is certified that error appears in the above-identified patent and that said Letters Patent is hereby corrected as shown below:

On the Title Page

Item (54) and in the Specification, Column 1, Lines 1-4, "ELECTROLYSIS CELL WITH MULTIPLE MEMBRANES FOR CUCL/HCI ELECTROLYSIS IN HYDROGEN PRODUCTION" should read --ELECTROLYSIS CELL WITH MULTIPLE MEMBRANES FOR CUCL/HCL ELECTROLYSIS IN HYDROGEN PRODUCTION--

Signed and Sealed this
Sixth Day of June, 2017

Michelle K. Lee
*Director of the United States Patent and Trademark Office*